United States Patent Office 3,705,874
Patented Dec. 12, 1972

3,705,874
PROCESS FOR THE PRODUCTION OF POLY-
HYDANTOIN PLASTICS CONTAINING IMIDE
GROUPS
Rudolf Merten, Leverkusen, and Wilfried Zecher, Cologne, Stammheim, Germany, assignors to Farbenfabriken Bayer Aktiengesellschaft, Leverkusen, Germany
No Drawing. Continuation of application Ser. No. 748,596, July 30, 1968. This application June 8, 1971, Ser. No. 151,135
Claims priority, application Germany, Aug. 7, 1967, F 53,158
Int. Cl. C08g 20/32, 33/02
U.S. Cl. 260—47 CP       7 Claims

ABSTRACT OF THE DISCLOSURE

Polyhydrantoin plastics containing imide-units and a process for their production by reaction of in a first stage a polyvalent glycine ester derivative with an excess of a polyisocyanate and in a second stage the preadduct thus obtained with a polyvalent compound containing at least one cyclic carboxylic acid anhydride group.

---

This application is a continuation of application Ser. No. 748,596, filed July 30, 1968, and now abandoned.

Processes for the production of polyhydantoin plastics are variously described in the literature, for example in Belgian patent specification No. 678,282 and in Dutch patent applications Nos. 67/08427 and 67/08428. All these processes are based on the reaction of polyvalent glycine ester derivatives with polyisocyanates or polyisothiocyanates.

For instance, it is possible in accordance with the aforementioned processes to react, a compound corresponding to the general formula $$R[NH-\underset{\underset{R_1}{|}}{\overset{\overset{R_1}{|}}{C}}-CO-R_2]_n \quad (I)$$

in which R represents an n-valent aliphatic, aromatic or araliphatic radical, each $R_1$ represents hydrogen or an alkyl radical, $R_2$ represents a hydroxyl, amino, alkylamino, dialkylamino, alkoxy or aryloxy group, and $n$ represents an integer from 2 to 4, or a compound corresponding to the general formula $$R\begin{bmatrix} R_1 \\ | \\ C-CO-R_2 \\ | \\ NH \\ | \\ R_3 \end{bmatrix}_n \quad (II)$$

in which R, $R_1$, $R_2$ and $n$ are as defined above, and $R_3$ represents hydrogen or an alkyl, aralkyl or aryl radical, with a polyisocyanate or polyisothiocyanate to form the corresponding polyurea, and simultaneously or subsequently cyclising the product.

The present invention relates to a process for the production of polyhydantoin plastics which contain imide groups in addition to the above-mentioned hydantoin groups.

In the preparation of the polyhydantoin plastics, the addition of an excess of an optionally masked polyisocyanate leads ultimately to the formation of terminal urethane or urea groups, which may then be converted into plastics of relatively high molecular weight in the usual way by modification with polyfunctional components.

The present invention is based on the recognition that oligomeric reaction products of the above-mentioned glycine ester derivatives (e.g. of Formulae I and II) and an excess of optionally masked polyisocyanates can be converted into high molecular weight products by reaction with polyfunctional cyclic carboxylic acid anhydrides.

It is an object of this invention to provide a process for the production of polyhydantoin plastics containing imide groups, which comprises reacting in a first stage a polyvalent glycine ester derivative with an excess of a polyisocyanate to form a preadduct containing hydantoin and urethane and/or urea groups, and reacting in a second stage said preadduct with a polyvalent compound containing at least one cyclic carboxylic acid anhydride group, said reacting in a first stage being effected in an organic solvent at temperatures of from 20 to 300° C. and said reacting in a second stage being effected at temperatures of from 100 to 500° C.

The second reaction stage may follow immediately after the first stage in the same reaction vessel or may be carried out simultaneously.

It is another object of this invention to provide a polyhydantoin plastic containing recurring imide-units of the general formula $$\begin{bmatrix} -\overset{O}{\underset{\|}{C}} \\ R_3'\begin{matrix} \diagdown \\ \diagup \end{matrix}N- \\ -\underset{\|}{C} \\ O \end{bmatrix}_y$$

wherein $R_3'$ represents a 2$y$-valent aliphatic, aliphatic-aromatic or aromatic radical, and $y$ represents an inger from 1 to 3, said imide-units being chemicall yincorporated in said polyhydantoin plastic by the free valence of the imido groups and optionally by additional functional groups.

The reaction is diagrammatically illustrated with reference to the example of pyromellitic acid dianhydride:

$$R-NH-COOR' + O\begin{matrix} CO \\ \diagup \diagdown \\ \diagdown \diagup \\ CO \end{matrix}\begin{matrix} CO \\ \diagup \diagdown \\ \diagdown \diagup \\ CO \end{matrix}O +$$

$$R'O-CO-NH-R \xrightarrow{\Delta} R-N\begin{matrix} CO \\ \diagup \diagdown \\ \diagdown \diagup \\ CO \end{matrix}\begin{matrix} CO \\ \diagup \diagdown \\ \diagdown \diagup \\ CO \end{matrix}N-R$$

$$+ 2CO_2 + 2R'OH$$

The components described in Belgian patent specification No. 678,282 and in Dutch patent applications Nos. 67/08427 and 67/08428 may be used as polyvalent plycine esters and as polyisocyanates in the production of the plastics according to the invention, the polyisocyanate component being used in a molar excess, based on the NH-groups present. This excess can be varied within wide limits, although from 105 to 180% of the equivalent quantity will generally be used. The "oligomeric" polyhydantoin plastics thus obtained and having recurring units

[(Hydrogen or a $C_{1-6}$ alkyl group) (Hydrogen or a $C_{1-6}$ alkyl group)]

(a bivalent aromatic, xylylene, or alkyl radical in which the alkyl group has 4-10 carbons and one or more can be replaced by O and S)

(a bivalent aromatic radical)

are then immediately further reacted in one step with a compound which, in addition to at least one cyclic anhydride group, contains other functional groups that are able to undergo polycondensation or polyaddition reactions, i.e. it may in some instances also contain other cyclic anhydride groups. Accordingly, compounds containing several cyclic anhydride groups, or compounds containing at least one cyclic anhydride group and additional carboxyl-, hydroxyl- or NH-groups in the molecule, will generally be used for this purpose.

The inventive polymers having the following recurring unit

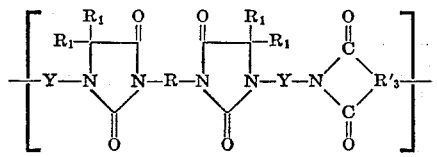

or

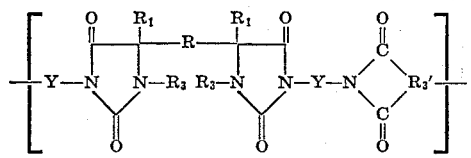

where R, $R_1$, $R_3$, $R_3'$, are as defined above and Y is as defined above (an aromatic radical, a xylylene radical, or ar $C_{4-10}$ alkyl radical one or more of which C's can be substituted by O and S).

In another modification of the process, the reaction on the urethane or urea groups is initially carried out with a compound containing at least one cyclic anhydride group and, optionally, additional carboxyl or carbalkoxy groups. Ultimate condensation by esterification of transesterification reactions on this carboxyl or carboalkoxy function is subsequently carried out in a third stage by the addition of polyalcohols, polyamines or amino alcohols, as known per se.

Compounds containing several functional groups are used for the reaction with oligomeric polyhldantoin plastics containing urethane or urea groups; and at least one of these functional groups must be a cyclic anhydride group, i.e. these compounds contain either two or more cyclic anhydride groups or at least one cyclic anhydride group besides additional reactive hydrogen atoms, which may be present, for example, in hydroxyl, mercapto, carboxyl or amino groups. Additional reactive hydrogen atoms may of course also be present in compounds where several anhydride groups are present in the molecule.

Cyclic acid anhydrides corresponding to the following general formula are particularly suitable:

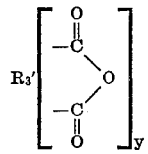

in which formula $R_3'$ represents a 2y-valent aliphatic, aliphatic-aromatic or aromatic radical with at least two functional groups that are able to undergo polycondensation or polyaddition reactions, and y represents an integer from 1 to 3.

Compounds of this kind can be derived, for example, from pyromellitic acid; trimellitic acid; mellitic acid, naphthalene-1,4,5,8-, naphthalene-2,3,6,7- or naphthalene-1,2,5,6- tetracarboxylic acid; from diphenyl ether-3,3', 4,4', or diphenyl-3,3',4,4'- or diphenyl ether-2,2',3,3'- or diphenyl-2,2',3,3'- tetracarboxylic acid; from 2,2-bis-(3,4-dicarboxyphenyl)-propane; from bis-(3,4-dicarboxyphenyl)-sulphone; from perylene-3,4,9,10-tetracarboxylic acid or from ethylene tetracarboxylic acid.

The internal anhydrides of hydroxy-, mercapto- or amino-substituted o-phthalic acids; and of hydroxy-, mercapto- or amino-substituted naphthalene dicarboxylic acids whose carboxyl groups are in the o-position to one another, can also be used. Bis-adducts of maleic acid or maleic acid anhydride with styrene or substituted styrenes are also suitable for the purposes of the process according to the invention, as are phenylene-bis-[alkane-di-(carboxylic acid anhydrides)], of the kind described in Belgian patent specification No. 613,374, bicyclo-tetracarboxylic acid dianhydrides of the kind described in U.S. patent specification No. 3,037,966, and polyanhydrides obtained by chlorinating paraffins in the presence of, for example, maleic acid anhydride.

The compounds used as anhydride components may also be of a more or less polymeric nature, for example bis-trimellitic anhydride esters of the structural formula

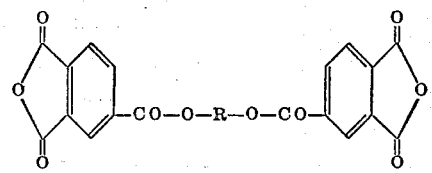

may also be used here. In this structural formula, R" represents a saturated or an unsaturated, aliphatic or cycloaliphatic bivalent radical in which aromatic, cycloaliphatic or heterocyclic ring systems and ether-, ester-, sulphide-, sulphoxide- or sulphone bridges may be incorporated, and which may optionally be substituted by chlorine, bromine or iodine atoms or by a nitro-, alkoxy- or mercapto group.

The following are examples of R":

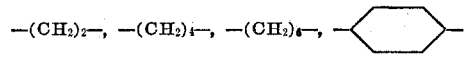

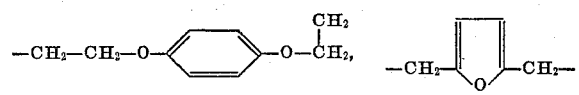

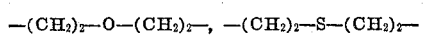

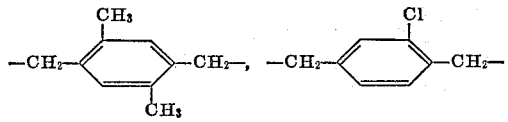

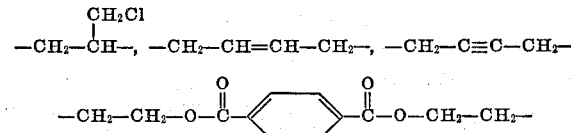

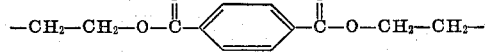

In general, the anhydrides will be used in a quantity corresponding to the excess of isocyanate, so as to provide for the imide groups in the polyhydantoin plastic. On the other hand, the anhydride components used may also be employed in a deficit, and then converted into plastics containing additional ester-, amide- or imide groups by the method already described in Belgian patent specification No. 678,278. The reaction is generally carried out in a solvent of the kind already used for hydantoin formation. Functional groups in such a solvent, such as hydroxyl groups, are not troublesome because the half esters formed in these solvents, for example with phenolic or alcoholic hydroxyl groups, effectively react as anhydrides at the reaction temperatures which are generally above 100 to 250° C.

In another modification of the invention, a reaction with cyclic anhydrides containing hydroxyl or carboxyl groups, or corresponding half esters takes place under similar conditions. Suitable components for this reaction include, in particular, hydroxy-phthalic acid anhydride, trimellitic acid, a naphthalene tricarboxylic acid containing at least two carboxyl groups ortho- to one another and similar hydroxynaphthalene dicarboxylic acids. The anhydride function in these compounds reacts with the urethane or urea groups present in the oligomeric hydantoin to form a pre-adduct containing carboxyl or hydroxyl and imide groups, which then reacts as a polycarboxylic acid or polyol with polyfunctional amines, alcohols or amino alcohols, in the usual way, to form plastics containing ester or amide groups in addition to the hydantoin and imide groups.

The processes described above are generally carried out in a solvent at a temperature of from 20 to 300° C. It is also possible to combine the two stages of hydantoin ring-closure and imide formation into one reaction stage by heating the mixture after the anhydride component has been added following addition of the isocyanate to the polyvalent glycine ester.

The reactions may be accelerated and the reaction temperatures lowered by the addition of catalysts. Suitable catalysts include organic compounds of titanium, tin, lead, copper, iron or of an alkaline earth metal, for example monomeric or polymeric titanium butoxide, lead naphthenate or lead octoate, zinc naphthenate or zinc octoate, copper hemiporphyrazine, iron acetonyl acetone, calcium naphthenate, or dibutyl tin dilaurate. Amine and ammonium compounds, in particular quaternary salts such as tetramethyl ammonium acetate, tetramethyl ammonium terephthalate, or choline octoate, may also be used.

These catalysts may be used in quantities of from 0.1 to 3% by weight, based on the solids component. Although they may safely be added in higher quantities, this does not involve any appreciable advantage.

The plastics thus obtained are particularly suitable for stoving lacquers, in particular for wire lacquers (electrical insulating lacquers). For this purpose, there are several requirements in regard to the process technique and in regard to the properties of the electrical conductor thus lacquered. The lacquering solution has to be adapted to various types of coating machines. As a rule, the wire passes through a lacquer bath behind which any excess lacquer is removed by a special stripper system which may comprise, for instance, two felt pads, pressed one against the other, through which the wire is guided. This process requires a lacquer of a relatively low viscosity which is obtained by using suitable solvents to provide a solution with a solids content of up to about 40% by weight, and preferably from 20 to 30% by weight. The diameter of the wire to be lacquered is also of some importance. The increases in the diameter of the wire that may be produced by lacquering are stipulated in DIN specifications 46,453 and 46,435. A solution of higher viscosity or a solution of higher solids content is normally stripped by means of metal stripper nozzles.

The wire then travels through a stoving oven in which the solvent is evaporated and the film of lacquer is hardened by the action of heat. This operation is repeated until the requisite layer thickness has been obtained. From 6 to 8 passes are usually required for this purpose.

In a lacquering test on a wire 0.77 mm. in diameter, the oven used is for example 4.2 m. long and the temperature is 400° C. The speed at which the wire is drawn through the oven amounts to 6 m. per minute. This speed can be increased to 10 m. per minute without any deterioration in the properties of the lacquered wire obtained. Six coats of lacquer produce an increase in diameter $d_2$ (diameter of the lacquered wire) minus $d_1$ (diameter of the blank copper wire) of 64 m$\mu$, i.e. the lacquer film has a thickness of 32 m$\mu$. The lacquered wire obtained in this way shows an outstanding resistance to abrasion and behaves particularly well in thermal shock treatment. It also has a high resistance to abrasion, excellent dielectric strength and a high level of hardness in the lacquer film.

From 100 to 150 double strokes were obtained in abrasion tests carried out by the NEMA method, the weight applied being from 550 to 600 g. depending on the thickness of the lacquer film.

The wire is wound around a mandrel of the same diameter, i.e. 0.7 mm., and the resulting wire coil is placed in a heating cabinet preheated to 260° C.; there are no signs after 60 minutes of any cracks or breaks in the lacquer film (thermal shock according to DIN 46453).

To determine the softening temperature (in accordance with DIN 46453), the lacquered wire has placed on it a steel pin which crosses the wire at an angle of 90° and which is under a weight of 1 kg. A voltage of 150 v. is applied between the steel pin and the copper. The whole is accommodated in a heating cabinet whose temperature is increased by 50° C. per hour. In the temperature range in which the film softens owing to its thermoplasticity, the steel pin penetrates through the film of lacquer. The direct contact between the steel pin and the copper wire releases an acoustic signal indicating the end of the test. With all the lacquered wires stoved within the above range (400° C., 6 to 10 m. per minute), it was possible to heat the oven to its maximum temperature of 330° C. without the lacquer film being penetrated by the steel pin.

The breakdown voltage measured on twisted wire specimens (DIN 46453) is from 8 to 9 kv.

The lacquer film has a hardness of 5 H (DIN 46453). There is no change in hardness after the lacquered wire has been treated for 30 minutes in ethanol at 50° C.

In addition, the lacquered wire does not develop any hair line cracks when flexed under water. For testing purposes, the wire is bent around a mandrel 10 mm. in diameter in a 0.5% by weight solution of common salt, a D.C. voltage of 100 v. being applied to the water bath and the copper wire. A current would flow in the event of crazing, illuminating an interconnected tell-tale lamp.

The lacquer solutions according to the invention usually contain suitable solvents or mixtures of solvents, in general those of the kind that have already been used in the preparation of these imide-modified polyhydantoins. According to the invention, it is also possible to use a minor quantity of non-solvents. Examples of suitable solvents include aromatic hydrocarbons, chlorinated aromatic hydrocarbons, aliphatic hydrocarbons, esters and ketones. N-alkyl pyrrolidone, dimethyl sulphoxide, dimethyl sulphone, dimethyl formamide, diethyl acetamide, phenol and cresol or mixtures thereof are particularly suitable.

The solids content of the solutions may be varied within wide limits, being governed both by the type of vehicle used and its behaviour in solution, and by the intended method of application. Solutions with a solids content from 10 to 60% by weight are generally suitable. For example, lacquers intended for lacquering wires on conventional lacquering machines may have a solids content of from about 10 to 45% by weight, depending both upon the method of application and the thickness of wire. By contrast, impregnating lacquers for impregnating coils will usually have a solids content of from about 35 to 50% by weight.

It has also been found that the hardening reaction can be accelerated by the addition of suitable catalysts, i.e. the reaction time is shortened and the stoving temperature simultaneously lowered. This is of importance so far as complete hardening on high speed wire-lacquering machines is concerned. Examples of such catalysts have been given above.

These catalysts are generally used in a quantity of from 0.1 to 3.0% by weight, based on the solids content of the lacquer. Although they may be added in greater quantities, this does not involve any tangible advantage.

Besides being suitable for use as stoving lacquers, the imide-modified polyhydantoin plastics obtained in accordance with the invention may also be widely used as temperature-resistant plastics. Solutions of the imide-modified polyhydantoins, for example in cresol or aliphatic halides, may be applied in a predetermined thickness, depending on the composition, by means of a casting machine to a heat-resistant substrate, which may comprise, for example, glass or metal and from which the finished film can readily be detached. By heating to temperatures of for example from 50 to 250° C., the solvent is evaporated and the finished film, which shows good mechanical properties at melting points above 300° C., can be peeled off from the substrate. Similarly, fibres can be produced by means of suitable spinning machines from imide-modified polyhydantoin plastics, particularly when bifunctional components, i.e. linear plastics, are used. It is possible by applying imide-modified polyhydantoins under pressure to, for example, glass fibre-, silk-, or asbestos cloths, to obtain corresponding laminates with outstanding high-temperature behaviour. It is also possible, optionally in the last stage of manufacture by applying pressure, to obtain solid plastics which if desired may be obtained in the form of foams of low unit weight by expansion.

Further details of the process according to the invention are given in the following examples:

EXAMPLE 1

(a) 398 parts by weight of N,N'-bis-(carbomethoxy-dimethyl methyl)-4,4'-diamino diphenyl methane are dissolved in 400 parts by weight of commercial cresol. 0.2 part by weight of endo-ethylene-piperazine are added to the resulting solution followed by the addition of 265 parts by weight of diphenylmethane-4,4'-diisocyanate dissolved in 260 parts by weight of xylene. The mixture is left standing overnight and then heated to 200° C. over a period of 6 hours during which cresol is distilled off, giving 806 parts by weight of a 76% solution with an isocyanate excess of 6%.

(b) 80.6 parts by weight of the 76% polyhydantoin oligomer solution thus obtained are dissolved in 200 parts by weight of cresol, and 1.31 parts by weight of pyromellitic acid dianhydride are added to the resulting solution at 120° C. The mixture is then heated for 6 hours at 200° C., giving 281 parts by weight of a lacquer solution which, following dilution with an equivalent amount of cresol, has a viscosity of 1175 $cp_{25}$.

A wire coated with this lacquer solution has a softening temperature above 330° C., coupled with good elastic properties, and outstanding resistance to heat and abrasion. Poor elastic properties are obtained when the first stage product obtained in accordance with (a) is stoved.

EXAMPLE 2

(a) 398 parts by weight of N,N'-bis-(carbomethoxy-dimethylmethane)-4,4'-diamino diphenylmethane are dissolved in 400 parts by weight of cresol, and a solution of 300 parts by weight of diphenylmethane-4,4'-diisocyanate dissolved in 180 parts by weight of toluene is added dropwise to the resulting solution at 30° C. After standing overnight, the mixture is heated for 6 hours at 200° C., followed, after cooling to around 140° C., by the addition of 77 parts by weight of trimellitic acid anhydride. This is followed by heating for another 4 hours at 200° C., during which carbon dioxide is given off. 1062 parts by weight of a solution of the reaction product are obtained.

(b) 12.5 parts by weight of ethylene glycol and 0.1 part by weight of lead oxide are added to 531 parts of the solution thus obtained. The carboxyl groups still present are then esterified at a temperature of up to 200° C. under normal pressure, and the cresol which is distilled off is replaced. 540 parts by weight of an approximately 63% by weight imide- and ester-modified polyhydantoin plastic solution are obtained which can be stoved as described in Example 1 to form an electrical insulating lacquer.

(c) Results similar to those described in 2(b) are obtained by carrying out esterification with a mixture of 4.6 parts by weight of glycerol and 9.6 parts by weight of ethylene glycol (instead of the 12.5 parts by weight of glycol used in 2(b)).

EXAMPLE 3

(a) 1051 parts by weight of a 64.3% solution of oligo-hydantoin first stage with an isocyanate excess of 30%, are initially prepared as described in Example 1(a) from 398 parts by weight of N,N'-bis-(carbomethoxy-diphenyl-methyl)-4,4'-diamino diphenyl methane in 400 parts by weight of cresol and 325 parts by weight of diphenyl methane-4,4'-diisocyanate.

(b) 105.1 parts by weight of this first stage solution in 110 parts by weight of cresol are reacted with 6.54 parts by weight of pyromellitic acid anhydride at 200° C. to form an imide-modified polyhydantoin solution (217 parts by weight) which may be used as an electrical insulating material as described in Example 1(b) and which has a viscosity of 1115 $cp_{25}$ following dilution with 1 part by weight of cresol for each part by weight of the above solution.

(c) The procedure is as described in 3(a) and (b) using a 20% isocyanate excess and the corresponding quantity of pyromellitic acid dianhydride. 212.5 parts by weight of a corresponding solution with a viscosity of 1921 $cp_{25}$, are obtained after dilution with cresol in an amount of 1:1 by weight.

(d) The procedure is as described in 3(a) and (b) using a 10% isocyanate excess and the corresponding quantity of pyromellitic acid dianhydride. 217 parts by weight of corresponding solution with a viscosity of 2727 $cp_{25}$ are obtained after dilution with cresol in an amount of 1:1 by weight.

(e) 105.1 parts by weight of the pre-adduct 3(a) are initially heated for 6 hours at 200° C. with 110 parts by weight of cresol and 11.6 parts by weight of trimellitic acid anhydride, followed by the addition of 3.5 parts by weight of glycol. 225 parts by weight of a lacquer solution, having a viscosity of 225 $cp_{25}$ after dilution with cresol in an amount of 1:1 by weight, are obtained after heating for another 4 hours at 200° C.

EXAMPLE 4

A pre-adduct is initially prepared from 159.2 parts by weight of N,N'-bis-(carbomethoxy dimethyl methyl)-4,4'-diamino diphenyl methane, 600 parts by weight of cresol and 0.2 part by weight of endo-ethylene piperazine, with 130 parts by weight of diphenyl-4,4'-diisocyanate dissolved in 100 parts by weight of xylene by heating for 2 hours at 200° C. 49.3 parts by weight of ethylene glycol-bis-trimellitate are added to the resulting pre-adduct. After heating for 6 hours at 200° C. (during which carbon dioxide escapes), 900 parts by weight of an imide-modified polyhydantoin solution are obtained, which has a viscosity of 460 $cp_{25}$ after dilution with cresol in an amount of 1:1 by weight and which may be stoved in the usual way to form a wire lacquer with a softening temperature above 330° C., a high resistance to abrasion and an outstanding resistance to thermal shock.

EXAMPLE 5

90 parts by weight of benzene-1,3-diisocyanate (140 mol percent), based on N,N'-bis-(carbomethoxy dimethyl methyl)-4,4'-diamino diphenyl methane, dissolved in 200 parts by weight of phenol, are added at 35° C. to 159.2 parts by weight of N,N'-bis-(carbomethoxy dimethyl methyl)-4,4'-diamino diphenyl methane, 200 parts by weight of phenol and 0.2 part by weight of endoethylene piperazine, and the resulting mixture is initially heated for 2 hours at 190° C. 51.6 parts by weight of benzophenone-3,3',4,4'-tetracarboxylic acid dianhydride are then added, followed by heating for another 6 hours at 190 to 200° C. 866 parts by weight of an approximately 34% by weight lacquer solution are obtained, having a viscosity of 546 $cp_{25}$ after dilution with cresol in an amount of 1:1 by weight and which may be converted as in Example 1(b) into an insulating material with corresponding properties, or may be treated on a hot roller to form a film with an excellent resistance to high temperatures and a high softening temperature.

EXAMPLE 6

The procedure is as described in Example 5 except that the 159.2 parts by weight of N,N'-bis-(carbomethoxy dimethyl methyl)-4,4'-diamino diphenyl methane used in that example are replaced by 122.8 parts by weight of N,N'-bis-(carboxymethyl dimethyl methyl)-1,3-diamino benzene. 882 parts by weight of a lacquer solution with a viscosity of 221 $cp_{25}$ after dilution with phenol in an amount of 1:1 by weight, and similar processing properties are obtained.

EXAMPLE 7

80 parts by weight of N,N'-bis-(carbomethoxy dimethyl methyl)-4,4'-diamino diphenyl ether are dissolved in 300 parts by weight of cresol, and the resulting solution is reacted with 65.6 parts by weight of diphenyl ether-4,4' - diisocyanate in solution in 150 parts by weight of cresol, following the addition of 0.1 g. of endo-ethylene-piperazine, forming an oligohydantoin which is condensed for 6 hours at 200° C., following the addition of 13.1 parts by weight of pyromellitic acid dianhydride. 453 parts by weight of an imide-modified polyhdantoin plastic linked through diphenyl ether radicals are obtained and are precipitated by the addition of acetone. This plastic may be cast to form a temperature-resistant film after solution in methylene chloride or phenol.

EXAMPLE 8

101 parts by weight of hexamethylene diisocyanate are added at 35° C. to 159.2 parts by weight of N,N'-bis-(carbomethoxy dimethyl methyl)-4,4'-diamino diphenyl ether, 200 parts by weight of phenol and 2 parts by weight of N,N'-dimethyl piperazine. After standing overnight, the mixture is heated to 200° C. 43.6 parts by weight of pyromellitic acid dianhydride are then added, followed by heating for another 6 hours at 200° C. 458 parts by weight of an approximately 65% by weight solution are obtained which has a viscosity of 4535 $cp_{25}$ after dilution with cresol in an amount of 1:1 by weight and which can be converted into a film in an analogous manner as in Example 7.

EXAMPLE 9

398 parts by weight of N,N'-bis-(carbomethoxy dimethyl methyl)-4,4'-diamino diphenyl methane and 0.7 part by weight of triethylene diamine are dissolved in 1592 parts by weight of cresol and a solution of 375 parts by weight of diphenyl methane-4,4'-diisocyanate in 750 parts by weight of xylene is added dropwise to the resulting solution at 30° C. The mixture is stirred for 10 hours at room temperature, the temperature gradually increasing to 190° C., followed, after cooling, by the addition of 109 g. of pyromellitic acid anhydride. The reaction mixture is then heated at 190° C. until a clear viscous solution is formed. The lacquer solution is coated on to a glass plate and stoved to form an elastic lacquer film initially at 210° C. and then at 290° C.

EXAMPLE 10

398 parts by weight of N,N'-bis-(carbomethoxy dimethyl methyl)-4,4'-diamino diphenyl methane dissolved in 1592 parts by weight of cresol are added dropwise, at a maximum temperature of 30° C., to a solution of 240 g. of phenylene-1,3-diisocyanate and 0.7 part by weight of triethylene diamine in 480 parts by weight of xylene. The mixture is left standing for about 12 hours and the xylene is then distilled off. After cooling, 109 parts by weight of pyromellitic acid dianhydride are added. The mixture is then slowly heated to between 190 and 200° C. and kept at this temperature for a period of 6 hours. A brown, viscous solution is obtained which is coated on to metal plate and stoved to form a clear lacquer film.

EXAMPLE 11

398 parts by weight of N,N'-bis-(carbomethoxy dimethyl methyl)-4,4'-diamino diphenyl methane in 1592 parts by weight of cresol are added dropwise at room temperature to a solution of 240 parts by weight of phenylene-1,3-diisocyanate in 480 parts by weight of xylene. The temperature is then increased to 190° C. over a period of 8 hours, during which the cresol is distilled off over a distillation bridge. 96 parts by weight of trimellitic acid anhydride are then introduced and heating is continued until there is no further evolution of carbon dioxide. The condensation product is then mixed with 150 parts by weight of a polyester of terephthalic acid, methylene glycol and glycerol, and the resulting mixture is coated on to a glass plate and stoved to form a clear, elastic lacquer.

EXAMPLE 12

A solution of 398 parts by weight of N,N'-bis-(carbomethoxy dimethyl methyl)-4,4'-diamino diphenyl methane in 1592 parts by weight of cresol is added at room temperature to 240 parts by weight of phenylene-1,3-diisocyanate dissolved in 480 parts by weight of xylene. The mixture is stirred for 6 hours at 190° C., during which excess methanol is distilled off. 144 parts by weight of trimellitic acid anhydride and, after another 6 hours, 18.6 parts by weight of ethylene glycol and 9.2 parts by weight of glycerol are then introduced. Stirring is then continued for about another 5 hours at 195° C. until no more carbon dioxide is evolved. A clear, hard lacquer film is obtained by stoving the resulting polyhydantoin imide ester solution.

We claim:

1. A process for the production of polyhydantoin plastics containing imide groups, which comprises reacting in a first stage a polyvalent glycine ester compound with an excess of a polyisocyanate to form an oligomeric polyhydantoin plastic containing hydantoin and urethane and/or urea groups, and reacting in a second stage said oligomeric polyhydrantoin plastic with a polyvalent compound containing as a reacting group at least one cyclic carboxylic acid anhydride group, said reacting in a first stage being effected in an organic solvent at temperature of from 20 to 300° C. and said reacting in a second stage being effected at temperatures of from 100 to 500° C. wherein the polyvalent glycine ester is selected from the group consisting of (I)

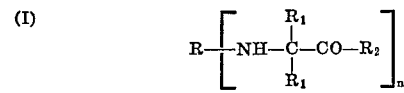

and (II)

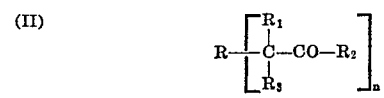

wherein
R is selected from the group consisting of an n-valent aliphatic, aromatic or araliphatic radical;
$R_1$ is selected from the group consisting of hydrogen and an alkyl radical;
$R_2$ is selected from the group consisting of hydroxyl, amino, alkylamino, dialkylamino, alkoxy or aryloxy;
$R_3$ is selected from the group consisting of hydrogen, or an alkyl, aralkyl, or aryl radical;
and $n$ is an integer from 2 to 4.

2. Process of claim 1 said reacting in a first stage and in a second stage being carried out substantially simultaneously at temperatures of from 20 to 500° C.

3. Process of claim 1 wherein the polyvalent glycine ester has the Formula I.

4. Process of claim 1 wherein the polyvalent glycine ester is selected from the group consisting of N,N'-bis-(carbomethoxy-dimethyl methyl)-4,4'-diamino diphenyl methane, N,N'-bis-(carboxymethyl-dimethyl methyl)-1,3- diamino benzene, N,N' - bis - (carbomethoxy - dimethyl methyl)-4,4'-diamino diphenyl ether and N,N'-bis-(carbomethoxy-diphenyl methyl)-4,4'-diamino diphenyl methane.

5. Process of claim 1 wherein the polyisocyanate is selected from the group consisting of diphenyl methane-4,4'-diisocyanate, diphenyl-4,4'-diisocyanate, benzene-1,3-diisocyanate, diphenylether-4,4'-diisocyanate, hexamethylene diisocyanate and phenylene-1,3-diisocyanate.

6. Process of claim 1 wherein the polyvalent compound containing a cyclic carboxylic acid anhydride group is selected from the group consisting of pyromellitic acid dianhydride, trimellitic acid anhydride, pyromellitic acid anhydride, ethylene glycol-bis-trimellitate and benzophenone-3,3',4,4'-tetracarboxylic acid dianhydride.

7. A polyhydantoin plastic produced by the process of claim 1.

References Cited
UNITED STATES PATENTS

| | | | |
|---|---|---|---|
| 3,179,634 | 4/1965 | Edwards | 260—78 |
| 3,300,420 | 1/1967 | Frey | 260—2.5 |
| 3,314,923 | 4/1967 | Muller et al. | 260—78 |
| 3,397,253 | 8/1968 | Merten et al. | 260—830 |
| 3,489,696 | 1/1970 | Miller | 260—78 X |
| 3,448,170 | 6/1969 | Merten et al. | 260—858 |

HOWARD E. SCHAIN, Primary Examiner

U.S. Cl. X.R.

117—124 E, 128.4, 132 C, 161 P; 161—197, 205, 227; 260—30.2, 30.8 DS, 2.5 N, 32.6 N, 32.8 N, 33.4 R, 33.6 R, 33.8 R, 47 CB, 63 N, 77.5 R, 78 A, 78 TF

UNITED STATES PATENT OFFICE
CERTIFICATE OF CORRECTION

Patent No. 3,705,874            Dated December 12, 1972

Inventor(s)   Rudolf Merten et al.

It is certified that error appears in the above-identified patent and that said Letters Patent are hereby corrected as shown below:

Column 2, line 31, "ineger" should read -- integer --; line 32, "chemicall yincorporated" should read -- chemically incorporated --; line 59, cancel from "and having through the formula" in line 68. Column 3, line 7, cancel from line 7, "The inventive ..." to line 26, "O and S.".

Signed and sealed this 14th day of January 1975.

(SEAL)
Attest:

McCOY M. GIBSON JR.
Attesting Officer

C. MARSHALL DANN
Commissioner of Patents